(12) United States Patent
Barbulescu et al.

(10) Patent No.: US 11,343,715 B1
(45) Date of Patent: May 24, 2022

(54) HEADER COMPRESSION FOR NETWORK

(71) Applicant: Rockwell Collins, Inc., Cedar Rapids, IA (US)

(72) Inventors: Ion Barbulescu, Cedar Rapids, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 18 days.

(21) Appl. No.: 17/000,317

(22) Filed: Aug. 23, 2020

(51) Int. Cl.
*H04W 28/06* (2009.01)
*H04L 69/04* (2022.01)
*H04L 67/1095* (2022.01)
*H04W 84/18* (2009.01)

(52) U.S. Cl.
CPC ......... *H04W 28/06* (2013.01); *H04L 67/1095* (2013.01); *H04L 69/04* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,450,562 A * | 9/1995 | Rosenberg | G06F 12/0802 341/55 |
| 6,618,397 B1 * | 9/2003 | Huang | H04L 29/06 370/392 |
| 7,403,543 B2 | 7/2008 | Lee et al. | |
| 8,213,403 B2 * | 7/2012 | Shon | H04L 69/161 370/349 |
| 8,553,688 B2 | 10/2013 | Vasseur et al. | |
| 9,769,701 B2 | 9/2017 | Denio et al. | |
| 2004/0103277 A1 * | 5/2004 | Seada | H04L 63/08 713/160 |

(Continued)

FOREIGN PATENT DOCUMENTS

| | | |
|---|---|---|
| WO | 0141397 A1 | 6/2001 |
| WO | 03001748 A8 | 4/2004 |
| WO | 2004063851 A3 | 9/2004 |

OTHER PUBLICATIONS

Cheng, Bow-Nan et al., "MANET IP Header Compression", IEEE Military Communications Conference, IEEE Computer Society, 2013, pp. 494-503.

(Continued)

*Primary Examiner* — Kenny S Lin
(74) *Attorney, Agent, or Firm* — Suiter Swantz pc llo

(57) ABSTRACT

A multi-node communication network may include a plurality of nodes including a first node and a second node. Each of the plurality of nodes may include a communication interface and a controller. The first node may be configured to: obtain an uncompressed packet, the uncompressed packet having uncompressed header data and a payload; compress the uncompressed header data into compressed header data having a tag and at least one compressed unit (CU), the tag indicating at least one type of compression for the at least one CU; and transmit a packet having the compressed header data and the payload to the second node. The second node may be configured to: receive the packet having the compressed header data and the payload; and based at least on the tag, decompress the at least one CU.

15 Claims, 16 Drawing Sheets

(56) References Cited

U.S. PATENT DOCUMENTS

| | | | |
|---|---|---|---|
| 2004/0136476 A1* | 7/2004 | Rosen | H04L 69/04 |
| | | | 375/340 |
| 2009/0080422 A1 | 3/2009 | Lee et al. | |
| 2010/0103865 A1* | 4/2010 | Ulupinar | H04L 29/12207 |
| | | | 370/315 |
| 2012/0188968 A1* | 7/2012 | Mie | H04L 45/026 |
| | | | 370/329 |
| 2013/0028095 A1* | 1/2013 | Vasseur | H04L 61/6059 |
| | | | 370/241 |
| 2014/0369365 A1* | 12/2014 | Denio | H04L 69/16 |
| | | | 370/474 |
| 2018/0117906 A1 | 5/2018 | Xie | |
| 2019/0173980 A1 | 6/2019 | Detwiler et al. | |
| 2020/0336572 A1* | 10/2020 | Kwon | H04L 47/36 |
| 2022/0038560 A1* | 2/2022 | Kim | H04W 28/06 |

OTHER PUBLICATIONS

Westphal, Cedric et al., "Stateless IP Header Compression", Nokia Technical Report, Aug. 2002, pp. 1-6.
Westphal, Cedric et al., "Stateless IP Header Compression", IEEE, 2005, pp. 3236-3241.
Wikipedia, "IPv4 Internet Protocol Version 4", Printed Aug. 5, 2020, URL: https/len.wikipedia.org/wlindex.php? title=IPv4&oldid= 968741880, 9 pages.

* cited by examiner

| IP Packet Tag Types | Adresses | Ports | DF/IHL | ToS/TTL/DF | Proto | ToS | TTL | ID | Flags/Off |
|---|---|---|---|---|---|---|---|---|---|
| TCP, no options, no fragmentation | X | X | | | | X | X | | |
| UDP, no options, no fragmentation | X | X | | X | | | | | |
| Not UDP nor TCP, no options, no fragmentation | X | | | X | X | | | | |
| Options, no fragmentation | X | | X | | X | X | X | | |
| Fragmentation, no options | X | | | | X | X | X | X | X |

FIG.6

| Source Address Type | Source Bits Type | Destination Address Type | Destination Address Bits | Padding Bits | Address CU Length (bits/bytes) |
|---|---|---|---|---|---|
| 1st Device | 0 | 1st Device | 0 | 0 | 0/0 |
| Special/30 | 0 | 1st Device | 0 | 0 | 0/0 |
| 1st Device | 0 | Generic Unicast | 32 | 0 | 32/4 |
| Special/29 | 3 | Special/30 | 0 | 5 | 8/1 |
| Special/28 | 4 | Special/28 | 4 | 0 | 8/1 |
| Special/28 | 4 | Preconfigured Multicast | 6 | 6 | 16/2 |
| Special/30 | 0 | Preconfigured Multicast | 6 | 2 | 8/1 |
| Special/28 | 4 | Generic Multicast | 28 | 0 | 32/4 |
| Special/28 | 4 | Generic Unicast | 32 | 4 | 40/5 |
| Generic Unicast | 32 | 1st Device | 0 | 0 | 32/4 |
| Generic Unicast | 32 | Special/29 | 3 | 5 | 40/5 |
| Generic Unicast | 32 | Preconfigured Multicast | 6 | 2 | 40/5 |
| Generic Unicast | 32 | Generic Multicast | 28 | 4 | 64/8 |
| Generic Unicast | 32 | Generic Unicast | 32 | 0 | 64/8 |

FIG. 12

| Source Port Type | Source Port Bits | Destination Port Type | Destination Port Bits | Ports CU Length (bits/bytes) |
|---|---|---|---|---|
| Well Known | 0 | Well Known | 0 | 0/0 |
| Well Known | 0 | Generic | 16 | 16/2 |
| Generic | 16 | Well Known | 0 | 16/2 |
| Generic | 16 | Generic | 16 | 32/4 |

FIG. 13

| Header Field | Decompression |
|---|---|
| IP Version | • Set to 4 (for IPv4) |
| IP Header Length | • DF/IHL CU's IHL value if sent OTA<br>• Otherwise, set to 5 |
| IP DSCP (6 bits) | • ToS CU's DSCP value if sent OTA<br>• ToS/TTL/DF CU's DSCP value if sent OTA as DTD (16 bits)<br>• ToS/TTL/DF CU's value for Precedence bits if sent OTA as CT (8 bits) with DTR bits set to 0 |
| IP ECN (2 bits) | • ToS CU's ECN value if sent OTA<br>• Otherwise, set to 0 |
| IP Total Length | • Calculated from received packet length with compressed header plus number of compressed bytes |
| IP ID | • ID CU's ID value if sent OTA<br>• Incremented local ID counter if DF is not set. The counter is monotonically increasing counter which begins at 1, goes to 255, then rolls over back to one 1 (i.e., is never 0). A single global counter is used regardless the destination. This is consistent with RFC 6864.<br>• Otherwise, set to 0 |
| Reserved Flag | • Set to 0 |
| IP DF Flag | • DF/IHL CU's DF value if sent OTA<br>• TTL CU's DF value if sent OTA<br>• ToS/TTL/DF CU's DF value if sent OTA as DTD (16 bits)<br>• Set to 1 if ToS/TTL/DF CU sent OTA as CT (8 bits)<br>• Flags/Offset CU's DF value if sent OTA<br>• Otherwise, set to 1 |
| IP MF Flag | • Flags/Offset CU's MF value if sent OTA<br>• Otherwise, set to 0 |
| IP Fragment Offset | • Flags/Offset CU's Offset value if sent OTA<br>• Otherwise, set to 0 |
| IP Source IP Address | • Address indicated by Tag and Address CU's decompressed value |
| IP Destination IP Address | • Address indicated by Tag and Address CU's decompressed value |
| IP Header Checksum | • Recalculated at destination (MANET MAC has a CRC which verifies that the packet is good) |
| UDP / TCP Source Port | • Port indicated by Tag and Ports CU' decompressed value if CU sent OTA |
| UDP / TCP Destination Port | • Port indicated by Tag and Ports CU' decompressed value if CU sent OTA |
| UDP Length | • Calculated from IP Total Length minus IHL |
| UDP Checksum | • Recalculated at destination (MANET MAC has a CRC which verifies that the packet is good) |

FIG.14

HEADER COMPRESSION FOR NETWORK

GOVERNMENT LICENSE RIGHTS

This invention was made by a subcontractor to a subcontractor to a government contract with government support under government contract number OTA No. W15QKN-15-9-1004; Spectrum Base Agreement #2017-308, awarded by the United States Army on Mar. 31, 2015. The government has certain rights in the invention.

BACKGROUND

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Internet protocol (IP) header compression is primarily used for lower speed links, such as serial links or wireless links, versus higher speed links, such as fiber optic links. Many of these links, especially wireless links can have occasionally dropped packets which increase latency and decrease throughput. Thus, there is a need for stateless IP compression for these slower wireless links with other than minimal dropped packet rate (e.g., >0.5%).

Currently, IP headers consume bandwidth for packets sent over low speed links. Standard IP header compression is stateful, which requires coordination and synchronization between the compressor node and decompressor node along with a history of prior transmissions. This means that if packets are lost, the compressor and decompressor have to resynch which increases latency and consumes network capacity.

Current IP header compression solutions are primarily stateful with Van Jacobson (VJ) compression (RFC 1144), Robust Header Compression (ROHC) (RFC 3095 & RFC 5225), IP Header Compression (IPHC) (RFC 2507 & 2508), and Low Power Wireless Personal Area Networks (6LoW-PANs) compression (RFC 4944, 6268, 7400, & 8066). Such stateful compression schemes require the compressor and decompressor to resynch either through the sending of a resynch request from the decompressor and/or the compressor periodically sending full state information to resynch. Existing header compression solutions use a context ID (CID) that is either exchanged in stateful compression or known apriori in stateless compression along with an array of flags that define what fields are included or compressed. The CID limits the number of source and destination addresses that can be compressed and the combination of CID and array of flags limits the maximum amount of compression possible across the range of possible valid IP messages. In some cases, unless the link layer below IP has a flag to indicate if the IP header is compressed or not, the use of the CID for some of these prior approaches can actually increase the size of the IP header.

SUMMARY

In one aspect, embodiments of the inventive concepts disclosed herein are directed to a multi-node communication network. The multi-node communication network may include a plurality of nodes including a first node and a second node. Each of the plurality of nodes may include a communication interface and a controller. The first node may be configured to: obtain an uncompressed packet, the uncompressed packet having uncompressed header data and a payload; compress the uncompressed header data into compressed header data having a tag and at least one compressed unit (CU), the tag indicating at least one type of compression for the at least one CU; and transmit a packet having the compressed header data and the payload to the second node. The second node may be configured to: receive the packet having the compressed header data and the payload; and based at least on the tag, decompress the at least one CU.

In a further aspect, embodiments of the inventive concepts disclosed herein are directed to method. The method may include: providing a multi-node communication network comprising a plurality of nodes, the plurality of nodes comprising a first node and a second node, wherein each of the plurality of nodes includes a communication interface and a controller; obtaining, by the first node, an uncompressed packet, the uncompressed packet having uncompressed header data and a payload; compressing, by the first node, the uncompressed header data into compressed header data having a tag and at least one compressed unit (CU), the tag indicating at least one type of compression for the at least one CU; transmitting, by the first node, a packet having the compressed header data and the payload to the second node; receiving, by the second node, the packet having the compressed header data and the payload; and based at least on the tag, decompressing, by the second node, the at least one CU.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6 illustrates a table associated with an exemplary IPv4 MANET system, in accordance with one or more embodiments of the present disclosure.

FIG. 12 illustrates a table associated with examples of combinations of source and destination address types, in accordance with one or more embodiments of the present disclosure.

FIG. 13 illustrates a table associated with exemplary port CUs, in accordance with one or more embodiments of the present disclosure.

FIG. 14 illustrates a table associated with how a decompressor node determines how to decompress the CUs based on the tag, in accordance with one or more embodiments of the present disclosure.

DETAILED DESCRIPTION

Figure 1:
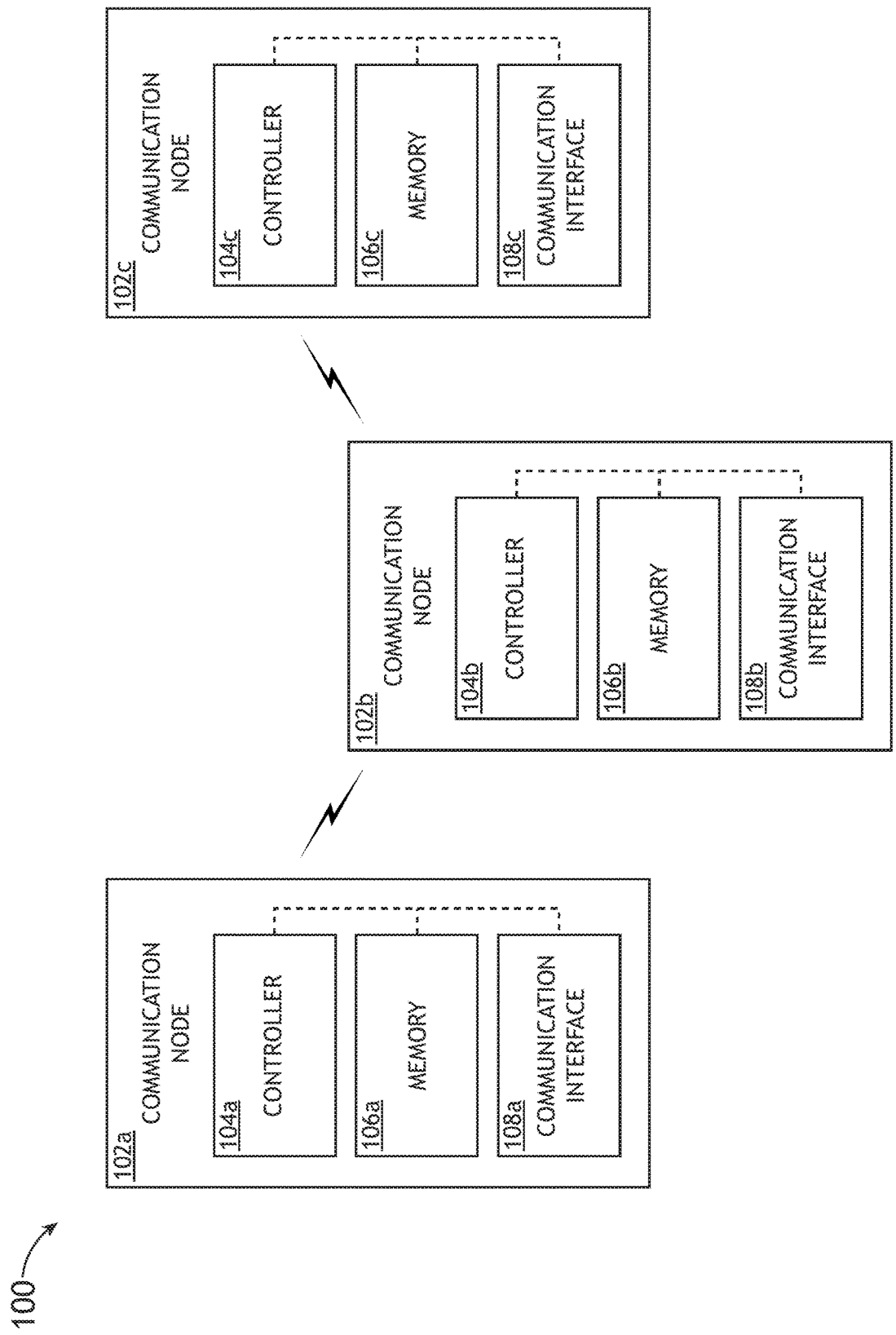
FIG. 1 illustrates a multi-node communication network, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Some embodiments may provide for stateless internet protocol (IP) compression so that compressors and decompressors do not have to synchronize and maintain a compression state, which can be especially important for wireless links with low throughput and more than negligible packet loss rate. Some embodiments can ensure that an IP packet will never increase in size across all valid IP packet formats.

FIG. 1 illustrates a multi-node communication network 100, in accordance with one or more embodiments of the present disclosure. In embodiments, the multi-node communication network 100 may include a plurality of communication nodes 102. For example, the multi-node communication network 100 may include a first communication node 102a, a second communication node 102b, and a third communication node 102c. In some embodiments, wherein the nodes 102 may be wirelessly communicatively coupled.

The multi-node communication network 100 may include any multi-node communication network known in the art. For example, the multi-node communication network 100 may include a mobile ad-hoc network (MANET) in which each communication node 102 within the multi-node communication network is able to move freely and independently. Similarly, the one or more communication nodes 102 may include any communication node known in the art which may be communicatively coupled. In this regard, the one or more communication nodes 102 may include any communication node known in the art for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/ controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of their communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, radio frequency (RF), LoRa, and the like.

In some embodiments, the controller 104 of a communication node 102 may be configured to carry out and/or cause to be carried out any or all of the steps and functions of the present disclosure.

For example, the controller 104a of a first communication node 102a may be configured to carry out and/or cause to be carried out any or all of the steps and functions of the present disclosure. The controller 104a of the first communication node 102a may be configured to carry out and/or cause to be carried out any or all of the following steps: obtain an uncompressed packet, the uncompressed packet having uncompressed header data and a payload; compress the uncompressed header data into compressed header data having a tag and at least one compressed unit (CU), the tag indicating at least one type of compression for the at least one CU; and/or transmit a packet having the compressed header data and the payload to a second communication node (e.g., 102b and/or 102c). In some embodiments, the controller 104a of the first communication node 102a may be further configured to carry out and/or cause to be carried out the following step: examine the uncompressed packet and determine the at least one type of compression to use on the uncompressed header data. In some embodiments, the controller 104a of the first communication node 102a may be further configured to carry out and/or cause to be carried out the following step: compress the payload, wherein the tag further indicates that the payload is compressed.

For example, the controller 104b of a second communication node 102b may be configured to carry out and/or cause to be carried out any or all of the steps and functions of the present disclosure. The controller 104b of the second communication node 102b may be configured to carry out and/or cause to be carried out any or all of the following steps: receive the packet having the compressed header data and the payload; and/or based at least on the tag, decompress the at least one CU.

In some embodiments, the multi-node communication network 100 is a mobile ad-hoc network (MANET).

In some embodiments, the uncompressed header data is uncompressed internet protocol (IP) header data, and the compressed header data is compressed IP header data. In some embodiments, the first node 102a and the second node 102b lack a synchronized compression state. In some embodiments, the first node 102a and the second node 102b have a synchronized compression state. In some embodiments, the uncompressed header data includes at least one header. In some embodiments, the at least one header is at least one of: at least one internet protocol (IP) header, at least one user datagram protocol (UDP) header, or at least one transmission control protocol (TCP) header.

In some embodiments, the tag is at a front of the compressed header data. In some embodiments, the tag is a first byte of the compressed header data. In some embodiments, the tag contains an internet protocol (IP) version number, an IP header length, and part of a traffic class.

In some embodiments, the at least one CU is at least one of: at least one Type of Service (ToS) CU, at least one Time to Live (TTL) CU, at least one ToS/TTL/Don't Fragment flag (DF) CU, at least one protocol (Proto) CU, at least one Identification (ID) CU, at least one flag/offset (Off) CU, or at least one DF/Internet Header Length (IHL) CU.

Each of these steps carried out by the controller 104 of a communication node 102 of the multi-node communication network 100 may be further shown and understood with reference to FIGS. 2-14.

Figure 2:
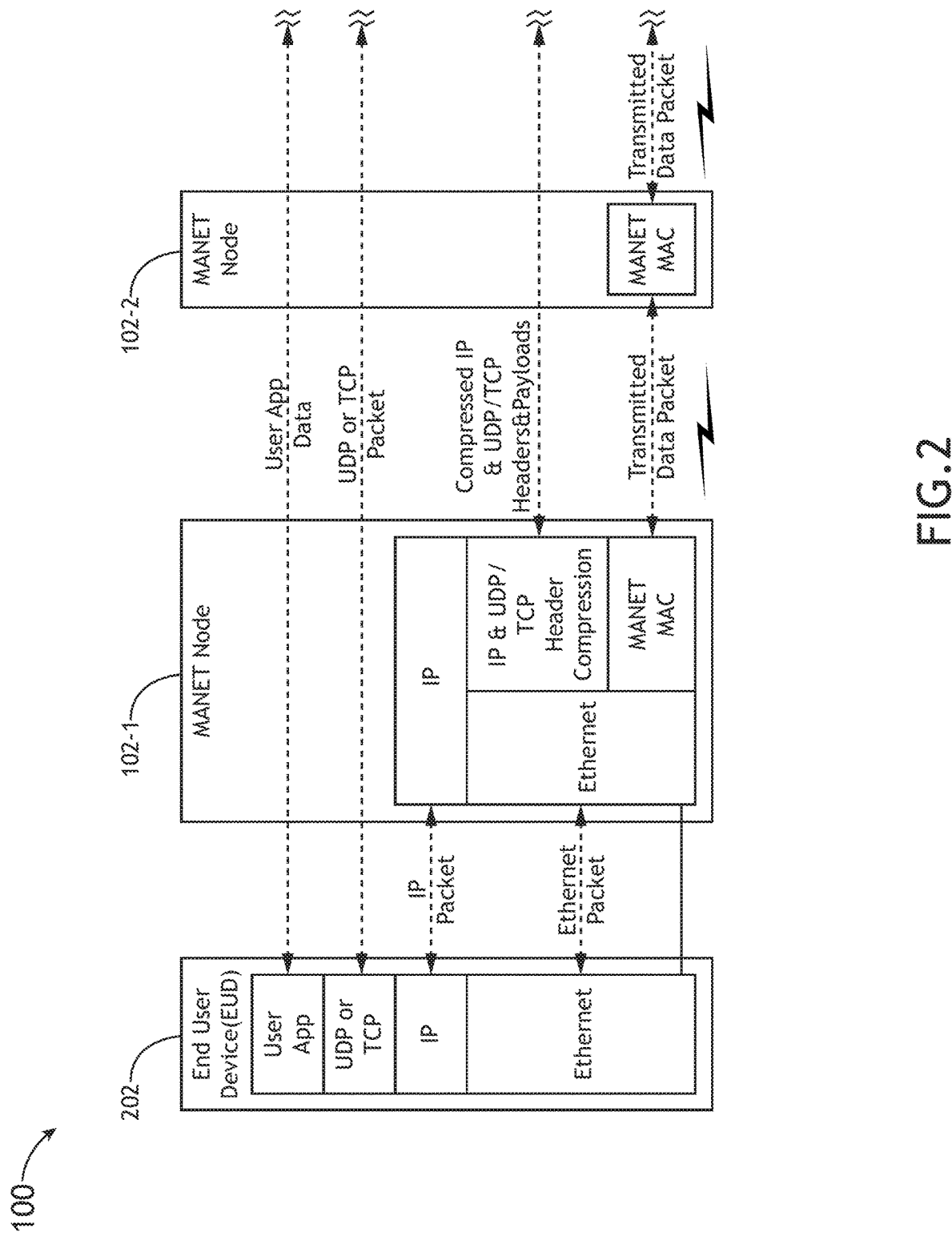
FIG. 2 illustrates the multi-node communication network of FIG. 1 as a MANET, in accordance with one or more embodiments of the present disclosure.
Figure 2:
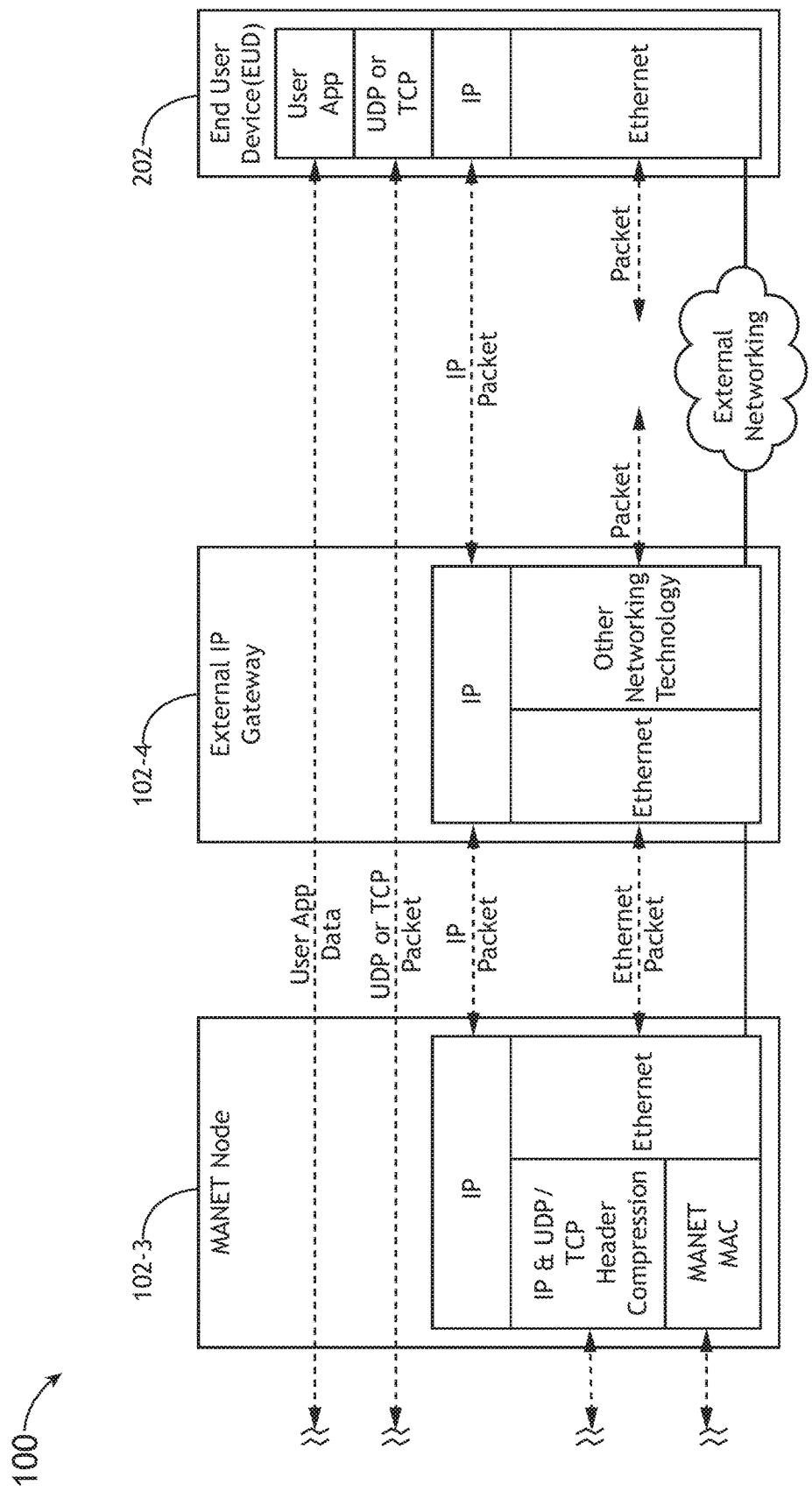

FIG. 2 exemplarily illustrates the multi-node communication network 100 of FIG. 1 as a MANET, in accordance with one or more embodiments of the present disclosure. In embodiments, the multi-node communication network 100 may include a plurality of nodes (e.g., MANET nodes 102-1, 102-2, 102-3), at least one (e.g., at least two) end user device (EUD) 202, and/or at least one external IP gateway 204, some or all of which may be communicatively coupled at any given time.

For example, each EUD 202 may be any suitable computing device, which for example, may include at least one processor and memory. Each EUD 202 may be configured to execute at least one user application. Each EUD 202 may have UDP or TCP functionality, IP functionality, and/or communication connectivity with a node 102-1, 102-2, or 102-3 (e.g., via wireless connectivity and/or ethernet connectivity). Each EUD 202 may be configured to output an uncompressed packet to a node 102-1, 102-2, or 102-3 and/or to receive an uncompressed packet from a node 102-1, 102-2, or 102-3.

For example, the controller 104 and/or the communication interface 108 of each node 102 may have (e.g., collectively have) IP functionality, communication connectivity (e.g., via wireless connectivity and/or ethernet connectivity), IP and/or UDP/TCP header compression functionality, and/or media access control (MAC) (e.g., MANET MAC) functionality.

For example, traffic (e.g., at least one data packet) may be compressed by first node 102-1 where the traffic enters the network 100 (e.g., from one of the EUDs 202). For example, the compressed traffic may be forwarded to the second node 102-2. The second node 102-2 may forward the compressed traffic to the third node 102-3. The third node 102-3 may decompress the traffic and send the uncompressed traffic (e.g., via the external IP gateway 204) to one of the of the EUDs 202.

Figure 3:
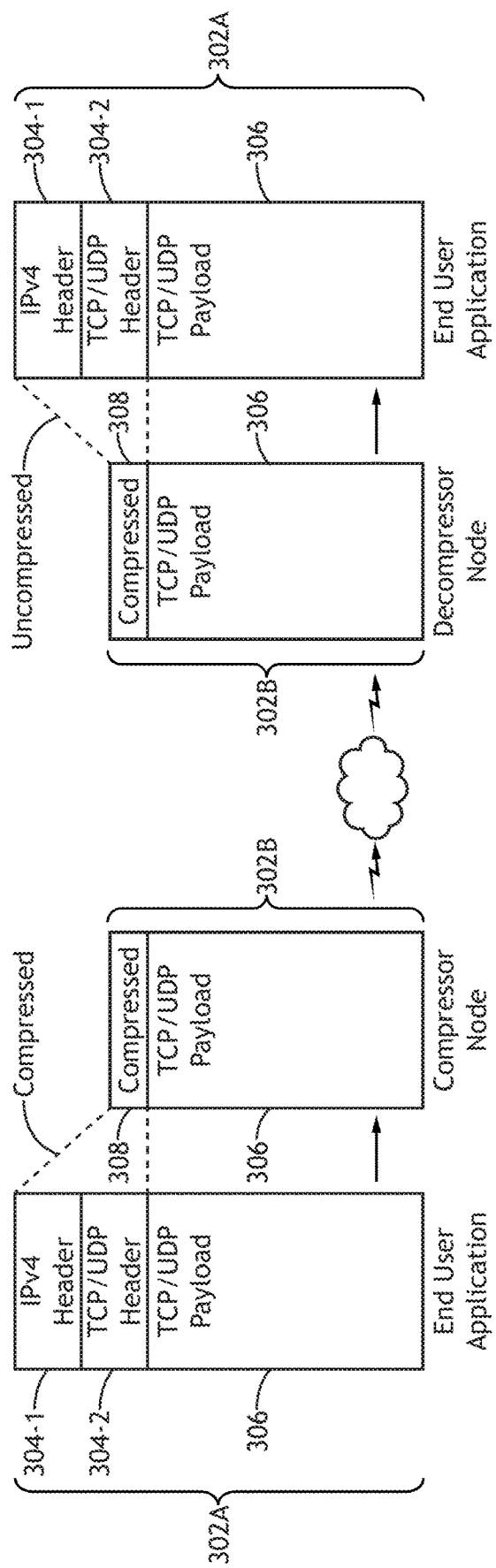
FIG. 3 illustrates IP header compression for the multi-node communication network of FIG. 2, in accordance with one or more embodiments of the present disclosure.

FIG. 3 exemplarily illustrates IP header compression for the multi-node communication network 100 of FIG. 2, in accordance with one or more embodiments of the present disclosure. For example, the node 102-1 (e.g., the compressor node) may examine the packet 302A to determine what compression can be performed, if any (e.g., if the packet 302A cannot be compressed below the packet's 302A original size, the packet 302A is sent as is). For example, if compression is possible, the node 102-1 (e.g., the compressor node) may compress an uncompressed packet 302A to form a compressed packet 302B. The uncompressed packet 302A may include uncompressed header data (e.g., including at least one header 304-1 and/or 304-2) and a payload 306 (e.g., a TCP/UDP payload). For example, the header 304-1 may be an IP version 4 (IPv4) header, and the header 304-2 may be a TCP/UDP header. The compressed packet 302B may include compressed header data 308 and the payload 306. The compressed header data 308 may include a tag and at least one CU. For example, the tag may be a first byte of the compressed header data and may indicate a type of compression for the at least one CU. The node 102-1 (e.g., the compressor node) may send the compressed packet 302B to another node(s) (e.g., 102-3), where the other node(s) (e.g., 102-3) (e.g., the decompressor node) may decompress the compressed packet 302B into the uncompressed packet 302A.

Figure 4:
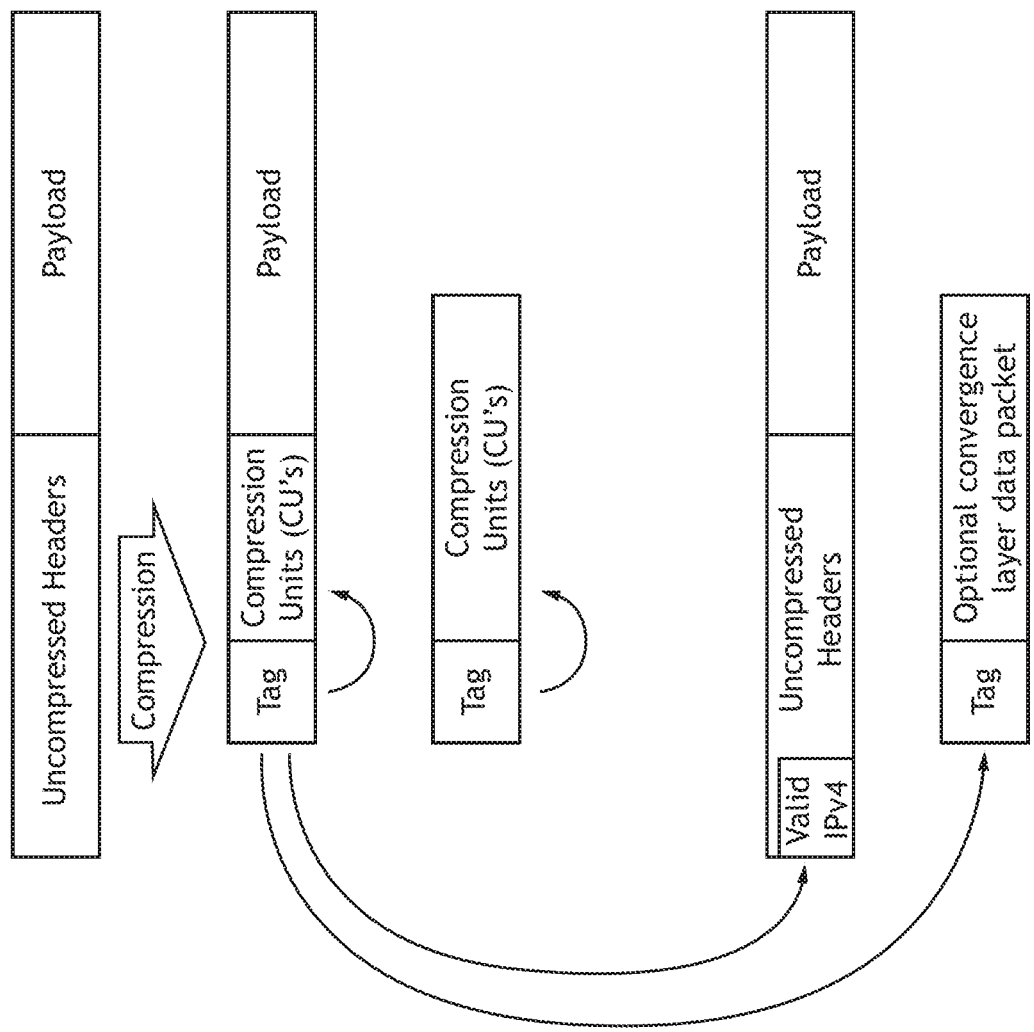
FIG. 4 illustrates a flow diagram of IP header compression for the multi-node communication network of FIG. 2, in accordance with one or more embodiments of the present disclosure.

FIG. 4 exemplarily illustrates a flow diagram of IP header compression for the multi-node communication network 100 of FIG. 2, in accordance with one or more embodiments of the present disclosure.

The tag may indicate whether a packet is compressed or not and how various fields in that packet are compressed followed by an array of compressed fields (e.g., statelessly compressed fields), called compressed units (CUs). The tag may also indicate how to decompress the CUs. For example, CUs may be selected headers, such as IP, UDP, and/or TCP headers. In some embodiments, the payload can be compressed as a CU, such as by using larger block compression, such as Lempel-Ziv-Welch (LZW) compression. In some embodiments, the compression of IP addresses and transport ports can be improved based upon common configuration data at all nodes, although this is not required. In some embodiments, the tag may further indicate that the packet is a lower layer data packet.

In some embodiments, the stateless compression can use lower layer protocol information for cross layer information exchange. For example, an 802.3 link layer source and destination addresses can be mapped to the IP source and destination addresses, the link layer payload length can be mapped to the IP length, and link layer error detection can be used to eliminate the need for IP checksums. If this lower layer protocol information is not available, then the relevant fields can be sent as CUs. Similarly, the compressor and decompressor may have preconfigured multicast address and transport layer ports that may be a priori known for improved compression performance. For example, the compression can work for IPv4 and/or IP version 6 (IPv6).

In some embodiments, such stateless compression can be used for IPv4, UDP, and TCP protocol headers.

In some embodiments, such stateless compression may use a subnet per node 102 in the network 100 and the compressor and decompressor may know the subnet address from routing tables that also map to the underlying link layer addresses. In some embodiments, such stateless compression may only include the host address part. Similarly, such stateless compression may have preconfigured multicast address and transport layer ports that are a priori known and can be compressed.

For example, the stateless compression embodiment may have the following measured performance for tested exemplary uses:

IP/TCP Header—from 40 bytes down to 19-31 bytes;
IP/UDP Header—from 28 bytes down to 2-15 bytes;
IP Header only—from 20 bytes down to 3-12 bytes;
IP Header with Options—from 20 bytes down 5-13 bytes;
IP Header with Fragmentation—from 20 bytes down to 8-16 bytes;
IP Header with Fragmentation & Options—not compressed;
Large IP packets with good LZW compression—varies depending upon payload data. A nominal example is 1500 byte IP header plus payload packet down to 400 bytes plus tag.

Figure 5:
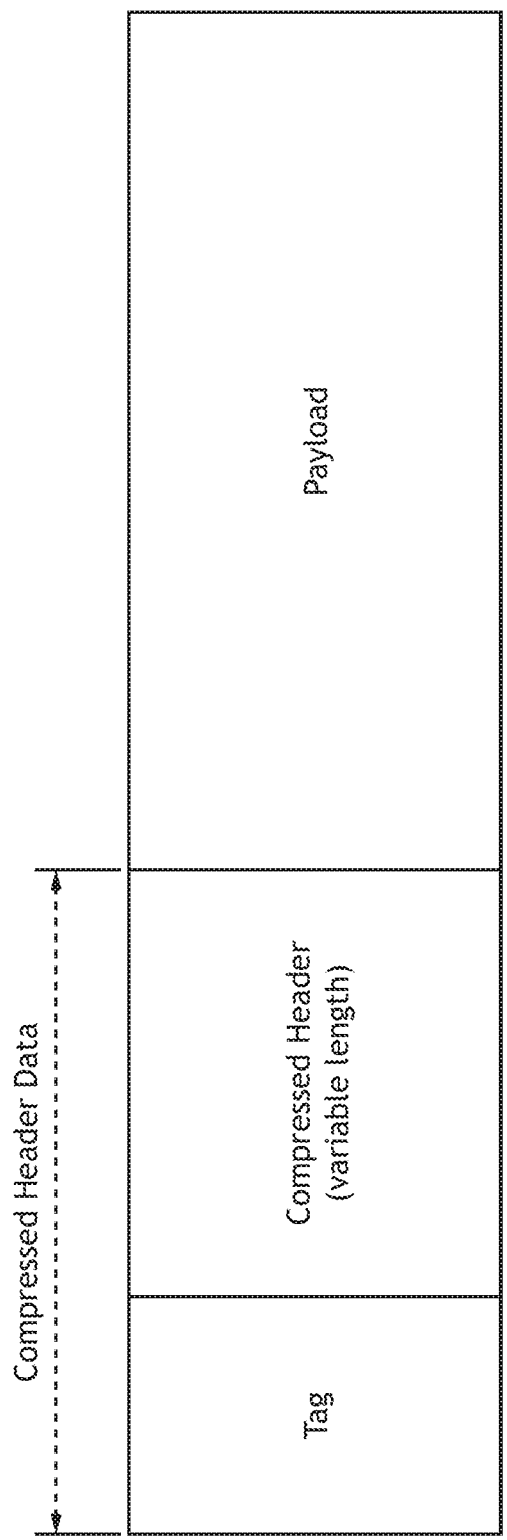
FIG. 5 illustrates a compressed packet having compressed header data and a payload for the multi-node communication network of FIG. 2, in accordance with one or more embodiments of the present disclosure.

FIG. 5 exemplarily illustrates a compressed packet having compressed header data and a payload for the multi-node communication network 100 of FIG. 2, in accordance with one or more embodiments of the present disclosure. The compressed header data may include a tag and at least one CU (e.g., at least one compressed header).

For example, the tag may be the first byte and may contain the IP version number (v4 or v6) and the IP header length (IPv4) and part of the Traffic Class (IPv6). For example, if the tag value is one of the valid IPv4 and/or IPv6 values, then the packet is an uncompressed packet. It should be noted that the first octet of an IPv4 header has two 4-bit nibbles. The most significant nibble is the version, which is set to 4 (for IPv4). The second nibble gives the size of the IP header as a number of 32-bit words. The smallest value is 5 for a header without options. The largest value is 15. So the first octet of any uncompressed IPv4 header typically takes values between decimal 69 and 79 inclusive.

If the tag value is not one of the valid IPv4 and/or IPv6 values, then the packet is a compressed packet and the tag value indicates how the packet is compressed. This may typically be a list of CUs followed by an uncompressed IP payload. In some embodiments, a compressed packet could be a completely compressed header and payload using compression such as Lempel-Ziv-Welch (LZW). In addition, for some MANET networks, the tag could indicate a MANET control packet, such as routing or MAC control.

FIG. 6 exemplarily illustrates a table associated with an exemplary IPv4 MANET system the compresses IP headers, IP and UDP headers, and IP and TCP headers, in accordance with one or more embodiments of the present disclosure. For example, the table lists the types of packets that can be compressed and the different CUs (e.g., addresses, ports, DF/IHL, ToS/TTL/DF, Proto, ToS, TTL, ID, and/or Flags/Off) that are compressed for each packet type.

Figure 7:
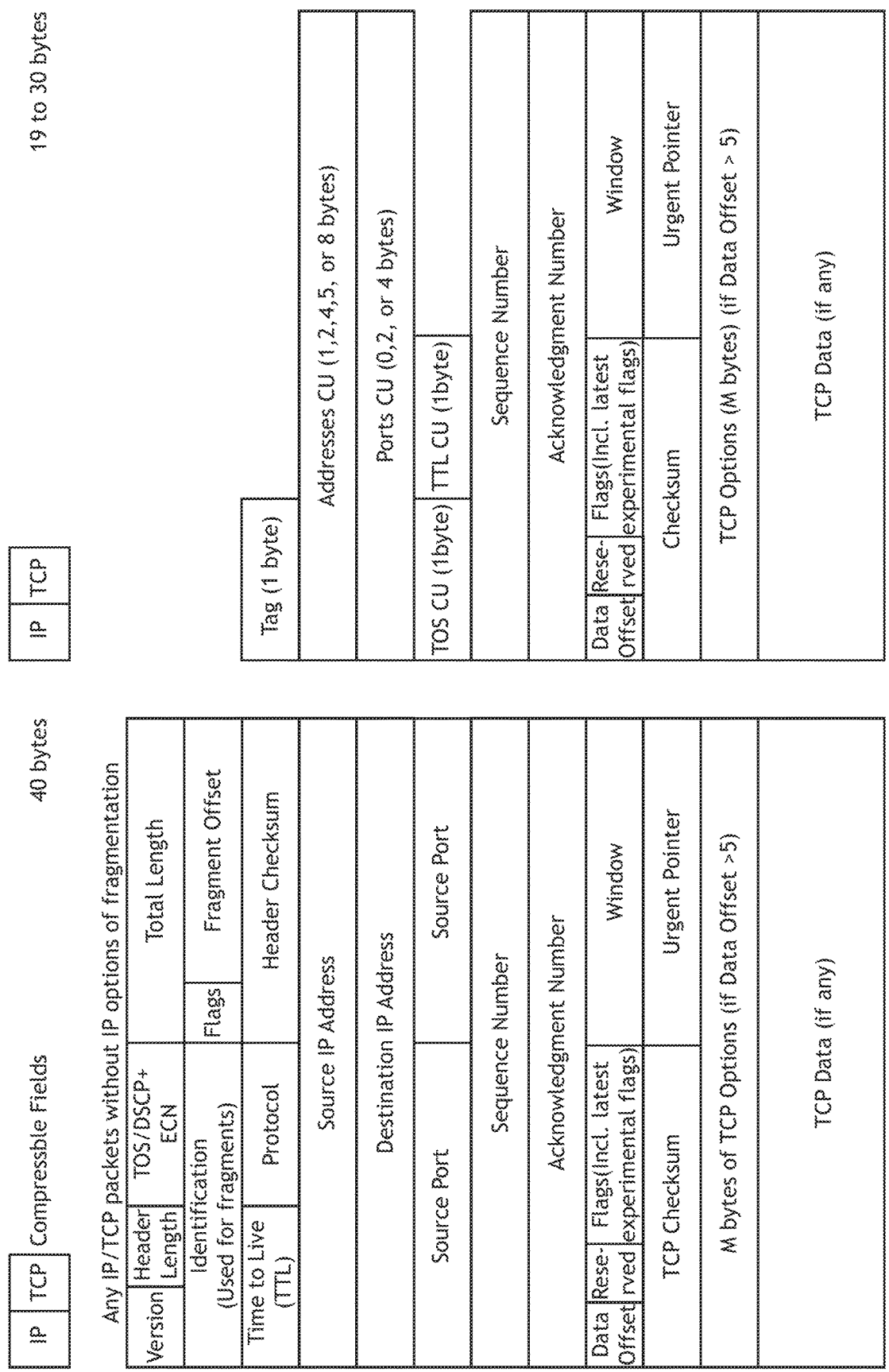
FIG. 7 illustrates an amount of possible compression for an IP/TCP Header, in accordance with one or more embodiments of the present disclosure.

FIG. 7 exemplarily illustrates an amount of possible compression for an IP/TCP Header from 40 bytes down to 19-31 bytes, in accordance with one or more embodiments of the present disclosure.

Figure 8:
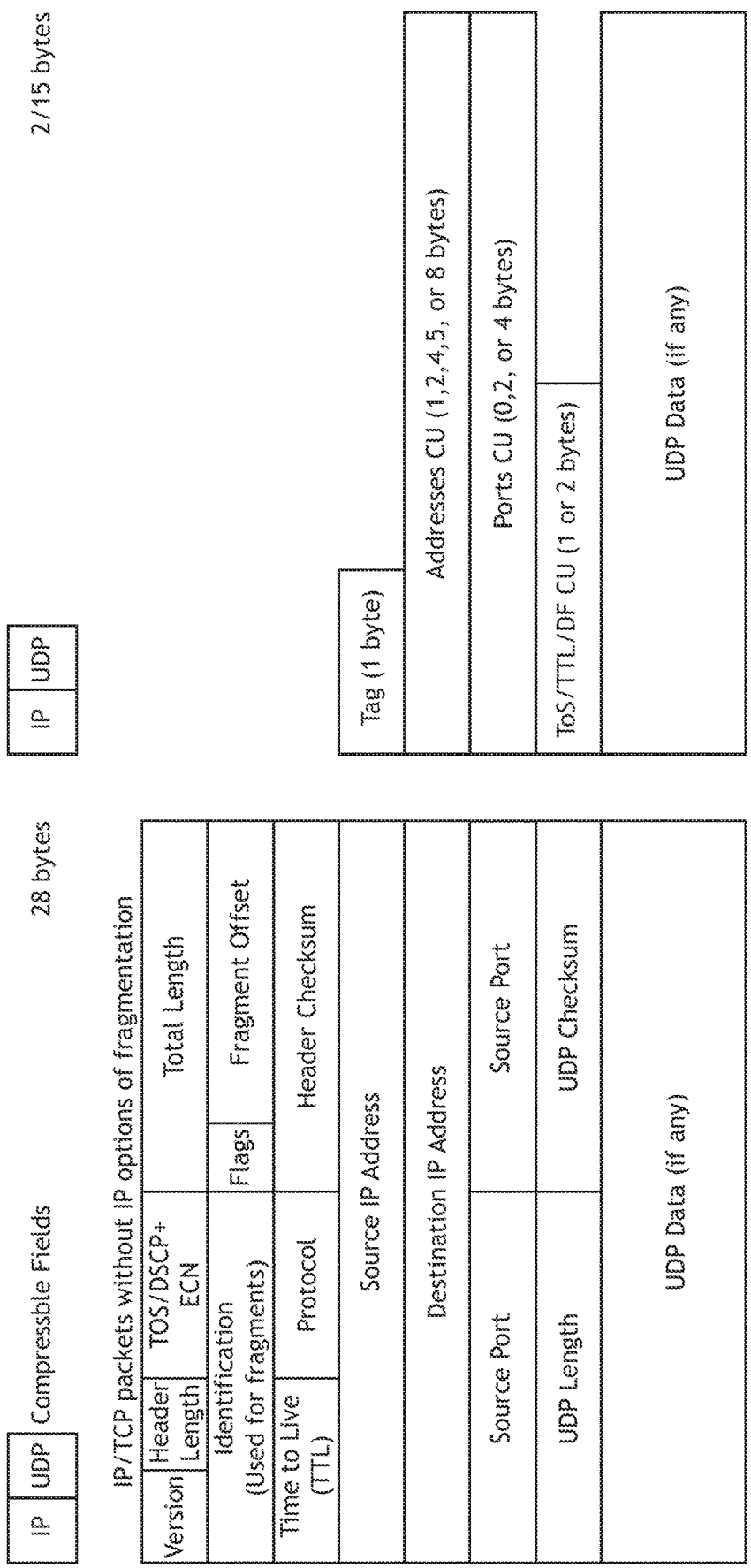
FIG. 8 illustrates an amount of possible compression for an IP/UDP Header, in accordance with one or more embodiments of the present disclosure.

FIG. 8 exemplarily illustrates an amount of possible compression for an IP/UDP Header from 28 bytes down to 2-15 bytes, in accordance with one or more embodiments of the present disclosure.

Figure 9:
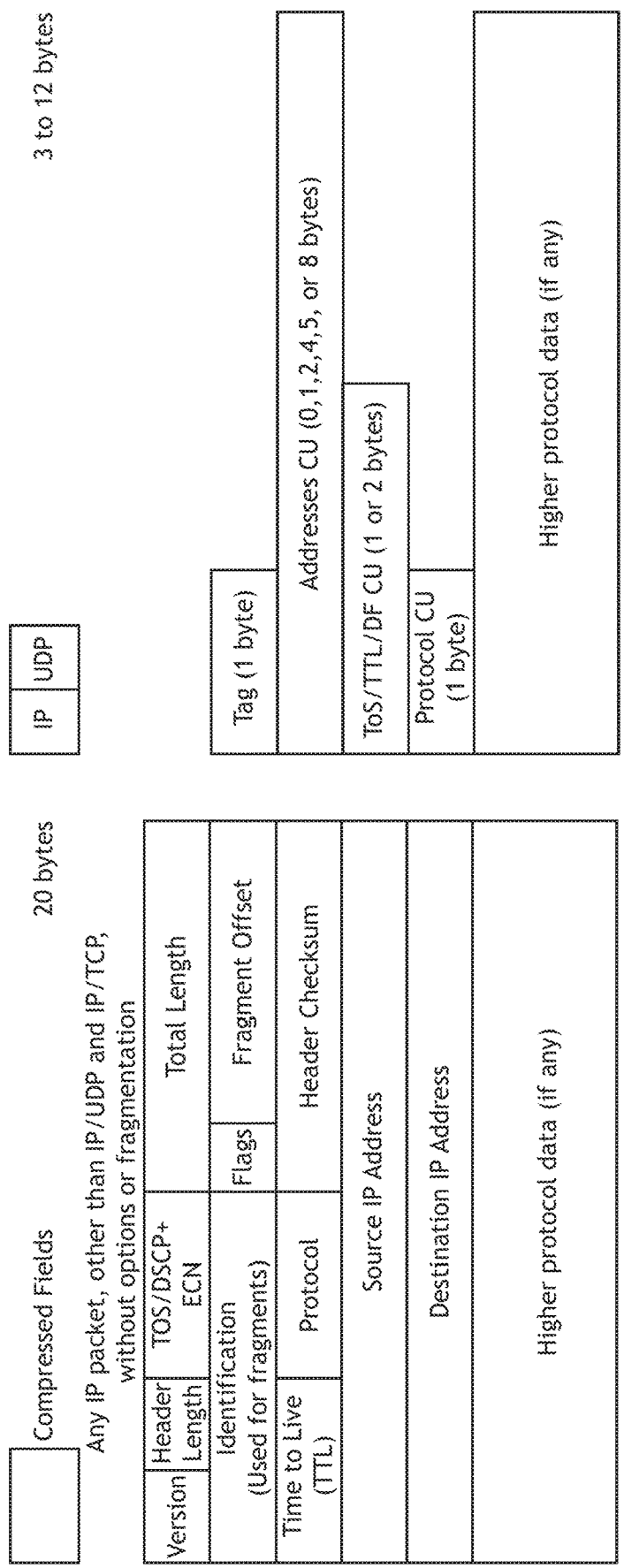
FIG. 9 illustrates an amount of possible compression for an IP Header only, in accordance with one or more embodiments of the present disclosure.

FIG. 9 exemplarily illustrates an amount of possible compression for an IP Header only from 20 bytes down to 3-12 bytes, in accordance with one or more embodiments of the present disclosure.

Figure 10:
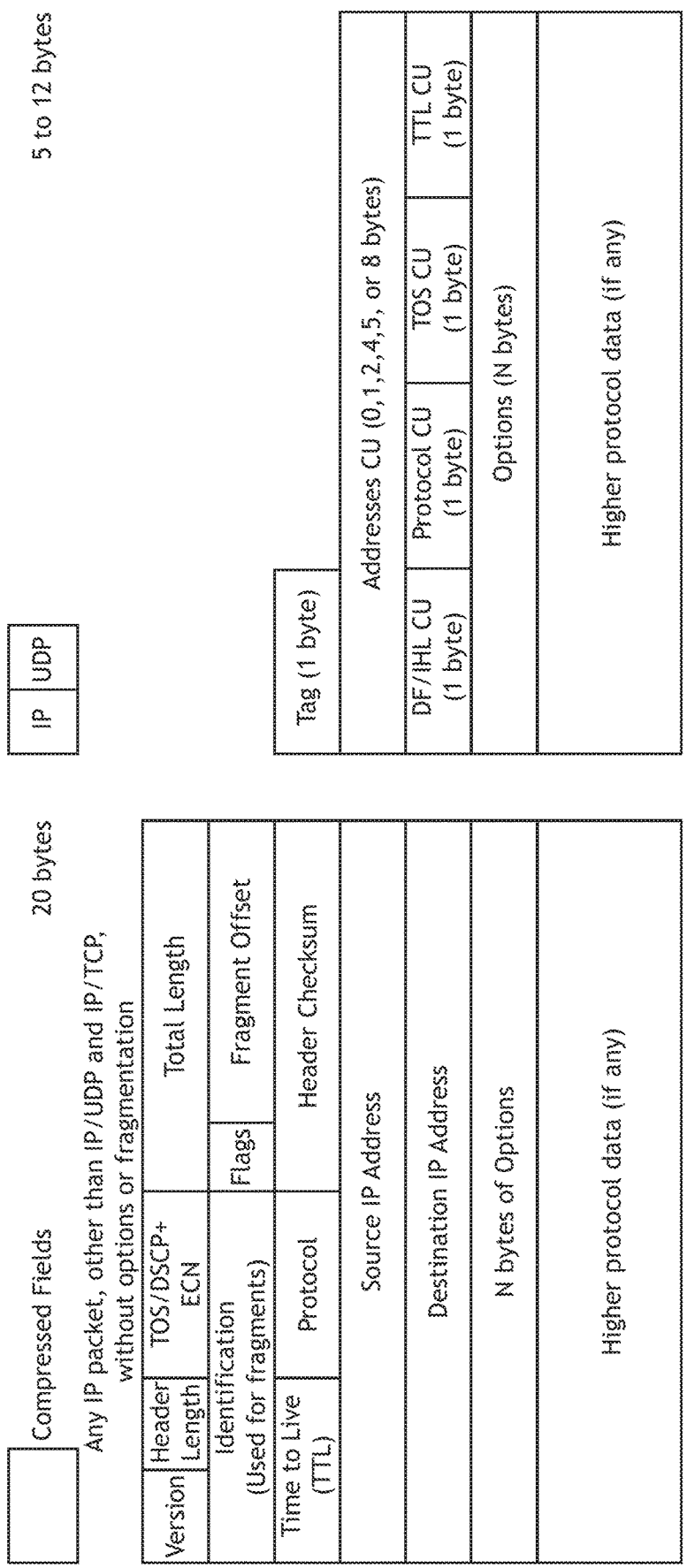
FIG. 10 illustrates an amount of possible compression for an IP Header with Options, in accordance with one or more embodiments of the present disclosure.

FIG. 10 exemplarily illustrates an amount of possible compression for an IP Header with Options from 20 bytes down to 5-13 bytes, in accordance with one or more embodiments of the present disclosure.

Figure 11:
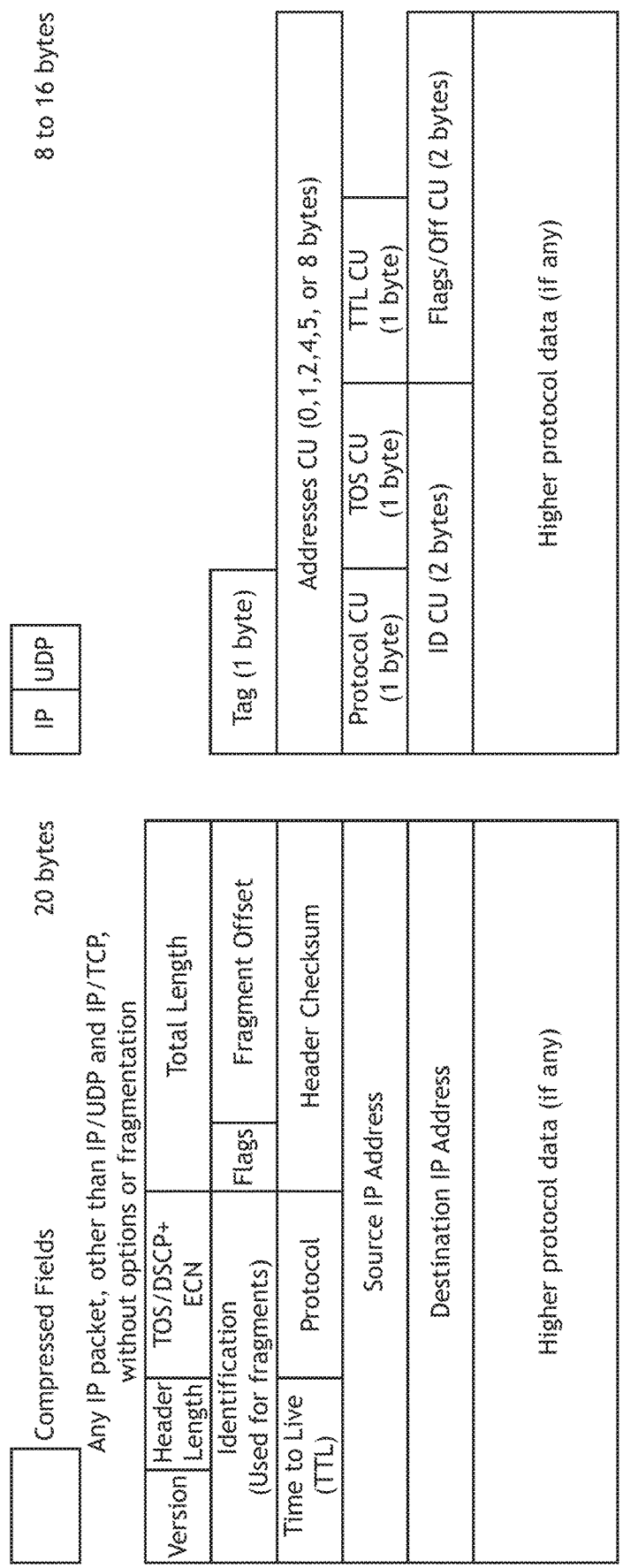
FIG. 11 illustrates an amount of possible compression for an IP Header with Fragmentation, in accordance with one or more embodiments of the present disclosure.

FIG. 11 exemplarily illustrates an amount of possible compression for an IP Header with Fragmentation from 20 bytes down to 8-16 bytes, in accordance with one or more embodiments of the present disclosure.

Referring to FIGS. 7-11, the exemplary amounts of possible compression assume that the MANET nodes 102 have a wired Ethernet interface with EUDs 202 and a wireless interface to the MANET network 100. External IP routers to other IP networks can attach to the MANET nodes 102 over the wired Ethernet as well.

Each MANET node 102 may have its own IP subnet for its wired Ethernet interface, and the subnets are routable IP addresses. The MANET interface may also have an IP address, which may be an unroutable IP address. The MANET interface may also have a MANET MAC address, and the MANET nodes 102 may know the mapping from the MANET node's 102 wired Ethernet LAN IP subnet to the MANET node's 102 wireless MANET MAC address. This means that the IP address for a source or destination IP address that is on a source or destination MANET node's 102 wired LAN subnet may only have to carry enough information to indicate the host part of the address and not the subnet part. For example, the host part of the MANET wired subnets may be limited to /30, /29, and /28, which reduces the number of bits that has to be sent over the air as described below.

An exemplary MANET network 100 can be preconfigured to support a set of predefined multicast addresses via a list of multicast address mapping to its index in the list. If the multicast address is one of the preconfigured multicast addresses, then the multicast address can be compressed down to its index. Otherwise, the complete 32-bit address may have to be sent.

FIG. 12 exemplarily illustrates a table associated with examples of combinations of source and destination address types, in accordance with one or more embodiments of the present disclosure.

Exemplary CUs types may include port CUs, ToS CUs, TTL CUs, ToS/TTL/DF CUs, protocol CUs, ID CUs, Flags/Offset CUs, and/or DF/IHL CUs.

FIG. 13 exemplarily illustrates a table associated with exemplary port CUs, in accordance with one or more embodiments of the present disclosure. An exemplary network may primarily carry a single application protocol, Variable Message Format (VMF), whose UDP and TCP port number may be 1581.

For example, the ToS CU may exist in TCP packets and/or in the presence of IP options and fragmentation. This CU may include the DHCP and the Explicit Congestion Notification (ECN) bits. In TCP packets, or in the presence of IP options or fragmentation, the 8-bit ToS field may be copied as-is (including DHCP and the ECN bits) into a single 8-bit CU.

For example, the 8-bit TTL CU may exist in two formats. First, for a TCP segment without IP fragmentation or IP header options, the 7 least significant bits of the TTL field in the IP header may be copied as-is into the 7 least significant bits of the CU, and the most significant bit of the CU may be set to the value of the DF field. In some embodiments, a default TTL value of 64 may be used. Second, in the presence of IP options or fragmentation (regardless of protocol), the 8-bit TTL field may be copied as-is into the TTL CU.

For example, the ToS/TTL/DF CU may only exist in non-TCP packets and datagrams without IP options or fragmentation. There may be two cases, an 8-bit CU or a 16-bit CU. First, if the Differentiated Services Code Point (DSCP) is one of the eight (8) Class Selector (CS)values, the TTL field is <32, and the Don't Fragment (DF) bit is one (1), then these three fields may be combined into a single 8-bit CU as follows: bits 0-2 of the DSCP field (called Precedence in original IP header definition) may be copied into the 3 most significant bits of the CU; the 5 least significant bits of the IP header TTL field may be copied into the least 5 significant bits of the CU; the Tag for this CU may imply that the DF bit in the reconstructed IP header is one (1); and/or the 2-bit ECN field (of the ToS field) may be ignored as it is normally only applicable to TCP, and is set to zero (0) by the decompressing nodes. Second, if The Flags/Offset CU is not applicable because the DSCP value is other than one of the eight (8) CS values, the TTL is >31, or the DF bit is zero (0), then the ToS/QoS bytes, the TTL field, and the DF bit may be combined into a single 16-bit CU as follows: the full 6-bit DSCP field in the IP header ToS may be copied into the 6 most significant bits of the CU; the full 8-bit TTL field may then be appended as the next 8 bits of the CU; the DF bit may be appended to the TTL bits; the least significant bit of the CU may be unused and set to zero; and/or the 2-bit ECN field (of the ToS field) may be ignored as it is normally only applicable to TCP, and may be set to zero (0) by the decompressing nodes.

For example, the Protocol CU may only exist in compressed IP packets other than UDP or IP, IP fragments, and IP headers with options. This may allow support for IP protocols other than User Datagram Protocol (UDP) and Transmission Control Protocol (TCP), such as Internet Control Message Protocol (ICMP). The Protocol CU may be built as follows: the protocol field in the IP header may be copied as-is into an 8-bit CU.

For example, the ID CU may only exist in IP fragments, including the initial fragment. The Identification (ID) field in the IP header may be copied as-is, i.e. network order, into a 16-bit CU.

For example, the Flags/Offset CU may only exist in IP fragments, including the initial fragment. The combined flags and Fragment-offset fields of the IP header may be copied as-is, i.e. network order, into a 16-bit CU.

For example, the DF/IHL CU may only exist in the case where there are IP options and no IP fragmentation. The DF/IHL CU may be created as follows: the DF bit may be followed by the 4-bit IHL field, placed into a single 8-bit CU. The two fields may be copied as they appear in the IP header. A 3-bit padding may be appended at the end of the CU.

FIG. 14 exemplarily illustrates a table associated with how a decompressor node determines how to decompress the CUs based on the tag, in accordance with one or more embodiments of the present disclosure.

Figure 15:
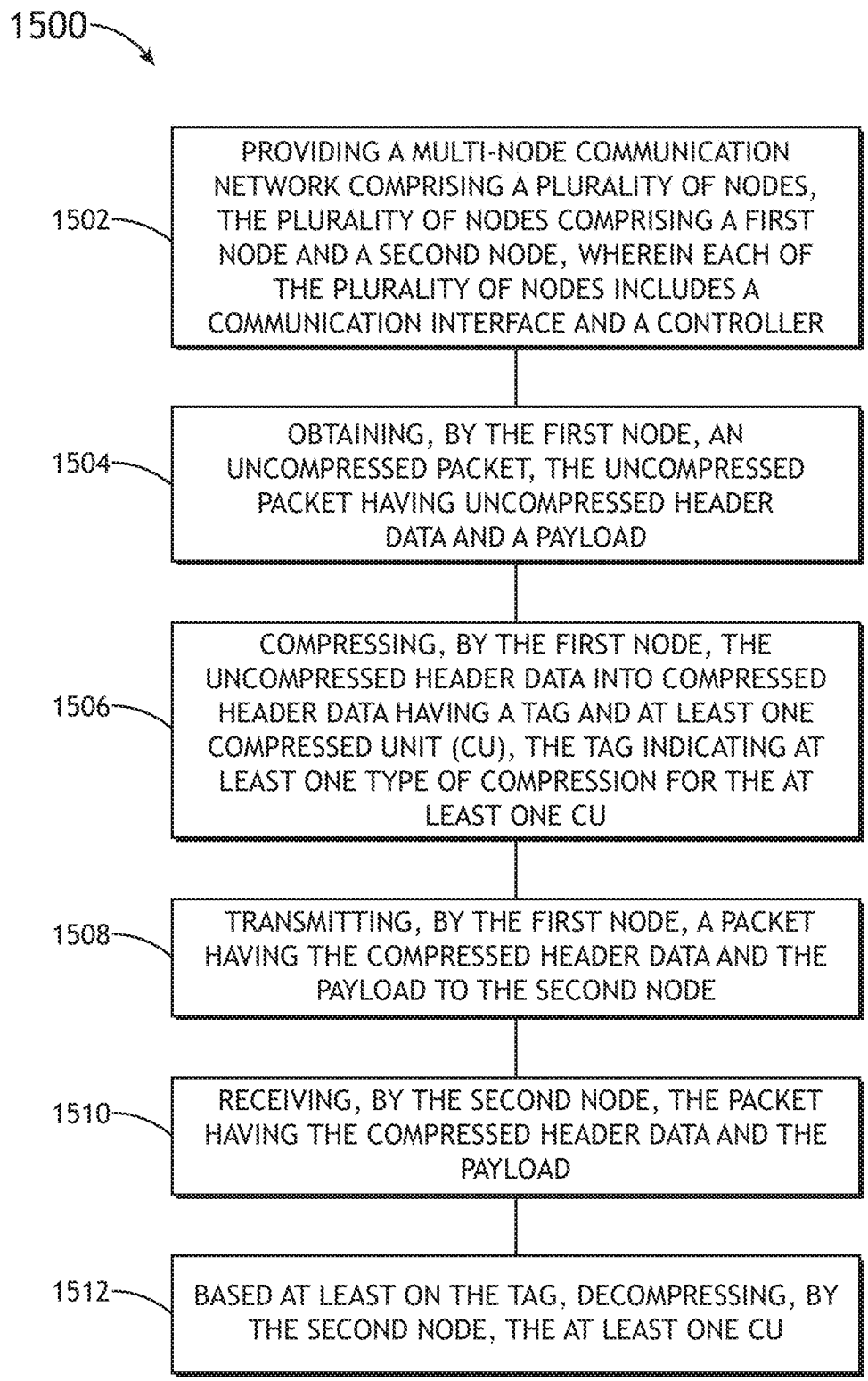
FIG. 15 illustrates a flowchart of a method, in accordance with one or more embodiments of the present disclosure.

Referring now to FIG. 15, an exemplary embodiment of a method 1500 according to the inventive concepts disclosed herein may include one or more of the following steps. Additionally, for example, some embodiments may include performing one or more instances of the method 1500 iteratively, concurrently, and/or sequentially. Additionally, for example, at least some of the steps of the method 1500 may be performed in parallel and/or concurrently. Additionally, in some embodiments, at least some of the steps of the method 1500 may be performed non-sequentially.

A step 1502 may include providing a multi-node communication network comprising a plurality of nodes, the plurality of nodes comprising a first node and a second node, wherein each of the plurality of nodes includes a communication interface and a controller.

A step 1504 may include obtaining, by the first node, an uncompressed packet, the uncompressed packet having uncompressed header data and a payload.

A step 1506 may include compressing, by the first node, the uncompressed header data into compressed header data having a tag and at least one compressed unit (CU), the tag indicating at least one type of compression for the at least one CU.

A step 1508 may include transmitting, by the first node, a packet having the compressed header data and the payload to the second node.

A step 1510 may include receiving, by the second node, the packet having the compressed header data and the payload.

A step 1512 may include based at least on the tag, decompressing, by the second node, the at least one CU.

Further, the method 1500 may include any of the operations disclosed throughout.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A multi-node communication network, comprising:
a plurality of nodes comprising a first node and a second node, wherein each of the plurality of nodes includes a communication interface and a controller;
wherein the first node is configured to:
obtain an uncompressed packet, the uncompressed packet having uncompressed header data and a payload;
compress the uncompressed header data into compressed header data having a tag and at least one compressed unit (CU), the tag indicating at least one type of compression for the at least one CU; and
transmit a packet having the compressed header data and the payload to the second node;
wherein the second node is configured to:
receive the packet having the compressed header data and the payload; and
based at least on the tag, decompress the at least one CU,
wherein the tag is at a front of the compressed header data, wherein the tag contains an internet protocol (IP) header length.

2. The multi-node communication network of claim 1, wherein the multi-node communication network is a mobile ad-hoc network (MANET).

3. The multi-node communication network of claim 2, wherein the uncompressed header data is uncompressed internet protocol (IP) header data, wherein the compressed header data is compressed IP header data.

4. The multi-node communication network of claim 3, wherein the first node and the second node lack a synchronized compression state.

5. The multi-node communication network of claim 3, wherein the first node and the second node have a synchronized compression state.

6. The multi-node communication network of claim 1, wherein the first node is further configured to examine the uncompressed packet and determine the at least one type of compression to use on the uncompressed header data.

7. The multi-node communication network of claim 1, wherein the tag is a first byte of the compressed header data.

8. The multi-node communication network of claim 7, wherein the tag further contains at least one of an internet protocol (IP) version number or part of a traffic class.

9. The multi-node communication network of claim 7, wherein the tag further contains an internet protocol (IP) version number and part of a traffic class.

10. The multi-node communication network of claim 1, wherein the uncompressed header data includes at least one header.

11. The multi-node communication network of claim 10, wherein the at least one header is at least one of: at least one internet protocol (IP) header, at least one user datagram protocol (UDP) header, or at least one transmission control protocol (TCP) header.

12. The multi-node communication network of claim 1, wherein the at least one CU is at least one of: at least one Type of Service (ToS) CU, at least one Time to Live (TTL) CU, at least one ToS/TTL/Don't Fragment flag (DF) CU, at least one protocol (Proto) CU, at least one Identification (ID) CU, at least one flag/offset (Off) CU, or at least one DF/Internet Header Length (IHL) CU.

13. The multi-node communication network of claim 1, wherein the first node is further configured to: compress the payload, wherein the tag further indicates that the payload is compressed.

14. The multi-node communication network of claim 1, wherein the first node and the second node are wirelessly communicatively coupled.

15. A method, comprising:
providing a multi-node communication network comprising a plurality of nodes, the plurality of nodes comprising a first node and a second node, wherein each of the plurality of nodes includes a communication interface and a controller;
obtaining, by the first node, an uncompressed packet, the uncompressed packet having uncompressed header data and a payload;
compressing, by the first node, the uncompressed header data into compressed header data having a tag and at least one compressed unit (CU), the tag indicating at least one type of compression for the at least one CU;
transmitting, by the first node, a packet having the compressed header data and the payload to the second node;
receiving, by the second node, the packet having the compressed header data and the payload; and
based at least on the tag, decompressing, by the second node, the at least one CU,
wherein the tag is at a front of the compressed header data, wherein the tag contains an internet protocol (IP) header length.

\* \* \* \* \*